F. WILLARD.
STRAINER MILK PAIL.
APPLICATION FILED MAY 2, 1919.

1,322,384.

Patented Nov. 18, 1919.

Inventor
Frank Willard.
By Franklin N. Hough
Attorney

UNITED STATES PATENT OFFICE.

FRANK WILLARD, OF UTICA, MISSOURI.

STRAINER MILK-PAIL.

1,322,384.  Specification of Letters Patent.  Patented Nov. 18, 1919.

Application filed May 2, 1919. Serial No. 294,203.

*To all whom it may concern:*

Be it known that I, FRANK WILLARD, a citizen of the United States, residing at Utica, in the county of Livingston and State of Missouri, have invented certain new and useful Improvements in Strainer Milk-Pails; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in a sanitary strainer milk pail and consists essentially in the provision of a receptacle having a cover with bayonet slot fastening means, and having a diagonally disposed funnel therein containing a double strainer, thus affording a thoroughly sanitary receptacle for milk.

The invention consists of a simple and efficient device of this character having various details of construction, combination and arrangement of parts which will be hereinafter fully described, shown in the accompanying drawings and then specifically defined in the appended claim.

Figure 1:
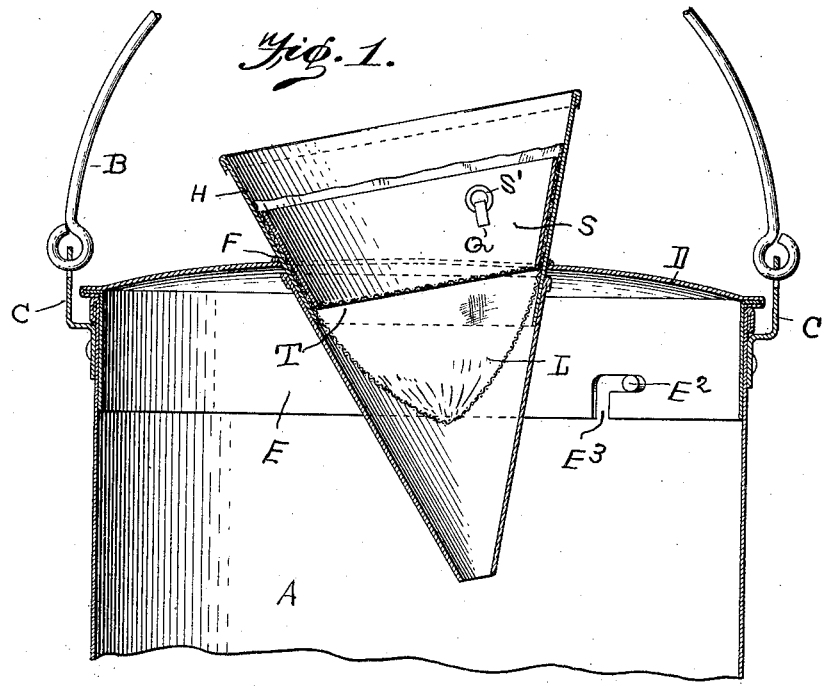
Figure 2:
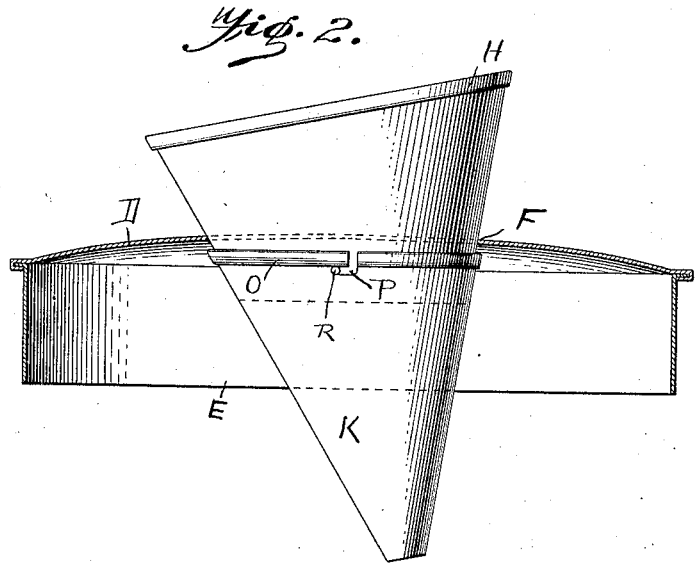

My invention is illustrated in the accompanying drawings which, with the letters of reference marked thereon, form a part of this application, and in which:

Figure 1 is a central vertical sectional view through a pail, cover and straining device, and Fig. 2 is a view in elevation showing the two telescoping funnel sections, one of which is fastened to the cover.

Reference now being had to the details of the drawings by letter:

A designates a pail having a handle B, and C designate ears fastened to the pail and engaged by the handle. The cover is designated by letter D and has a flange E telescoping within the pail, and held to the same by means of a lug $E^2$ engaging the angled slot $E^3$ forming a bayonet slot connection. Said cover has an opening F in the top thereof, adapted to receive the top section H of a conical shaped funnel which is securely soldered or otherwise fastened to the same. The lower portion of the funnel K has a beading O about its upper end and an angled slot P adapted to engage a lug R projecting from the wall of the top section H of the funnel, forming a bayonet joint.

Upon reference to Fig. 2 of the drawings it will be noted that a conical shell S is mounted within the fixed section H, and has a screen T at its lower end, while L designates a screen cloth interposed and held frictionally between the outer tapering surface of the shell S and the inner section of the conical top H with the lower portion of said screen cloth extending down into the section K.

To facilitate the removal of the shell a strap Q is inserted in an eye S' formed in the shell. In order to facilitate the milking into the pail equipped with my invention, the conical shaped sections are disposed at inclinations to each other.

By the provision of a milk pail embodying the features of my invention, it will be noted that the milk is strained as it passes into the pail, danger from spilling the milk by overturning the pail is reduced to a minimum, soil prevented from entering the receptacle, and a general sanitary device is afforded the parts of which may be readily separated for cleansing, etc.

What I claim to be new is:

In combination with the cover of a milk pail having an opening therein, a truncated funnel fastened in said opening and at an inclination to the vertical, a second funnel having bayonet slot connections with the funnel which is fastened to the cover and underneath the same, a strainer within the fixed funnel, and a strainer cloth intermediate the strainer and the fixed funnel.

In testimony whereof I hereunto affix my signature in presence of two witnesses.

FRANK WILLARD.

Witnesses:
 J. CADY,
 W. G. KURT.